United States Patent
Ader et al.

(10) Patent No.: US 6,416,115 B2
(45) Date of Patent: Jul. 9, 2002

(54) VEHICLE DOOR, IN PARTICULAR A TAILGATE

(75) Inventors: Stéphanie Ader, Nantua; Claude Jacquemard; Maëlig Pommeret, both of Oyonnax, all of (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/799,005

(22) Filed: Mar. 6, 2001

(30) Foreign Application Priority Data

Mar. 8, 2000 (FR) .............................. 00 02975

(51) Int. Cl.[7] ................................ B60J 5/02
(52) U.S. Cl. .............. 296/146.8; 296/50; 292/DIG. 43; 292/336.3
(58) Field of Search ................ 296/146.8, 50, 296/56, 146.5, 57.1, 106, 76, 186; 292/336.3, 201, DIG. 29, DIG. 43, 216

(56) References Cited

U.S. PATENT DOCUMENTS

| | | | | | |
|---|---|---|---|---|---|
| 3,623,764 | A | * | 11/1971 | Jacobus ........................ 296/50 |
| 4,143,904 | A | * | 3/1979 | Cooper et al. ............. 296/57.1 |
| 4,564,232 | A | * | 1/1986 | Fujimori et al. .......... 296/146.5 |
| 4,799,730 | A | * | 1/1989 | Harasaki ................... 296/146.8 |
| 4,822,098 | A | * | 4/1989 | Vogt et al. ................ 296/146.8 |
| 4,930,836 | A | * | 6/1990 | Grinn ..................... 296/146.11 |
| 5,058,937 | A | * | 10/1991 | Miehe et al. ................ 292/165 |
| 5,295,374 | A | * | 3/1994 | Bender et al. ....... 292/DIG. 43 |
| 5,303,971 | A | * | 4/1994 | Johnsen et al. ................ 296/50 |
| 5,451,089 | A | * | 9/1995 | Bender .......................... 296/50 |
| 5,803,526 | A | * | 9/1998 | Rohrberg ...................... 296/76 |
| 5,944,373 | A | * | 8/1999 | Seksaria et al. .......... 296/146.8 |
| 6,019,418 | A | * | 2/2000 | Emerling et al. ........ 296/146.8 |
| 6,065,316 | A | * | 5/2000 | Sato et al. ................... 292/201 |
| 6,108,979 | A | * | 8/2000 | Saffran et al. ........... 292/336.3 |
| 6,174,015 | B1 | * | 1/2001 | Shave ........................... 296/76 |
| 6,174,016 | B1 | * | 1/2001 | Ponziani ................... 296/146.8 |
| 6,209,366 | B1 | * | 4/2001 | Zagoroff ............. 292/DIG. 43 |
| 6,318,135 | B1 | * | 11/2001 | Johnsen et al. ...... 292/DIG. 43 |
| 2001/0005804 | A1 | * | 6/2001 | Ponziani ................... 296/146.8 |
| 2001/0042995 | A1 | * | 11/2001 | Kim ......................... 296/146.8 |

FOREIGN PATENT DOCUMENTS

| | | |
|---|---|---|
| DE | 37 19 273 | 12/1988 |
| EP | 0120763 | * 3/1984 |
| FR | 2 744 754 A | 8/1997 |
| GB | 1 019 039 A | 11/1963 |
| GB | 1 426 286 A | 2/1976 |
| JP | 59 186784 | * 10/1984 |

\* cited by examiner

*Primary Examiner*—Ken Patel
(74) *Attorney, Agent, or Firm*—Oliff & Berridge, PLC

(57) ABSTRACT

A vehicle door, in particular a tailgate (1), the door comprising an outside face (2) and an end face (4) opposite from a region where it is hinged to the vehicle. It includes a handle (10) integrated in the end face (4) and an opening (14) in the outside face (2) of the door to give access to said handle when the door is closed.

11 Claims, 2 Drawing Sheets

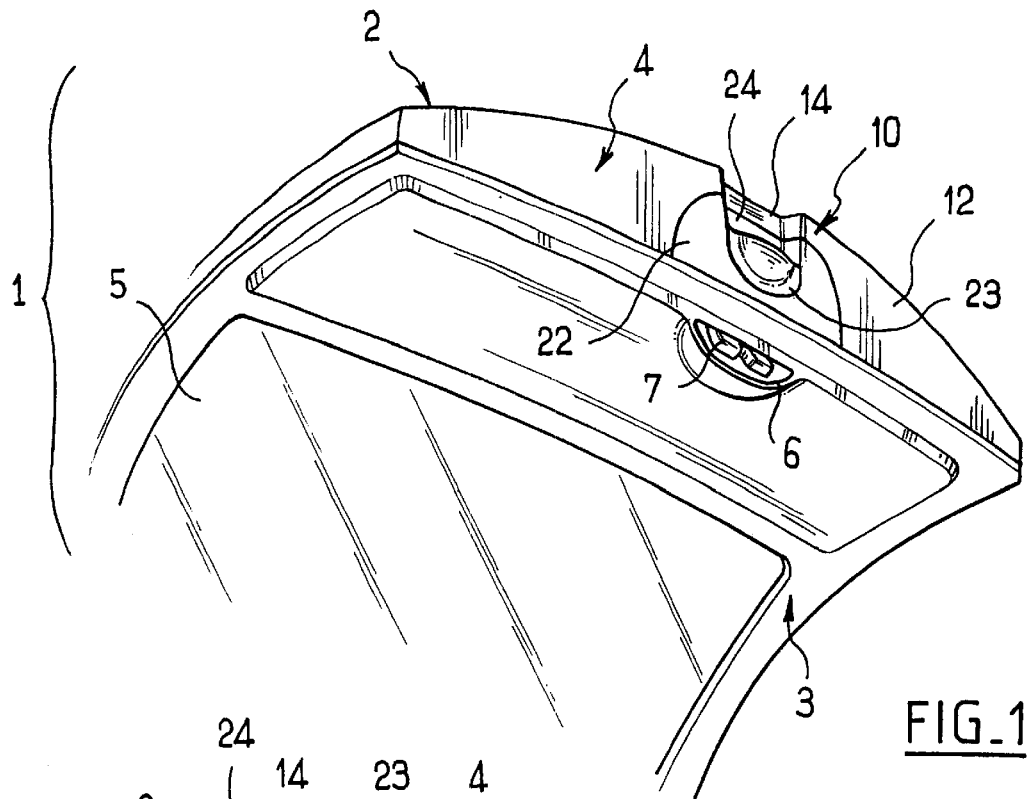
FIG_1
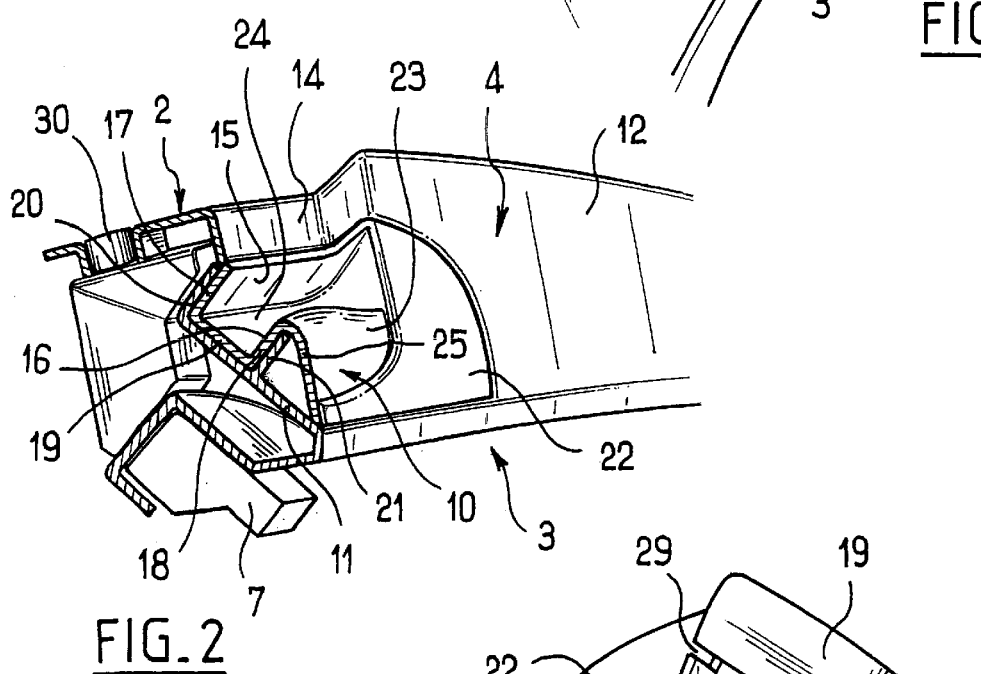
FIG_2
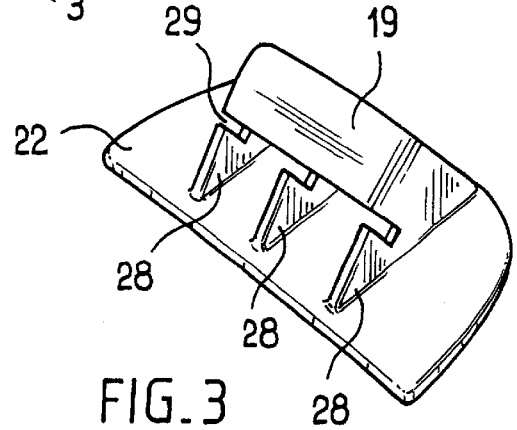
FIG_3

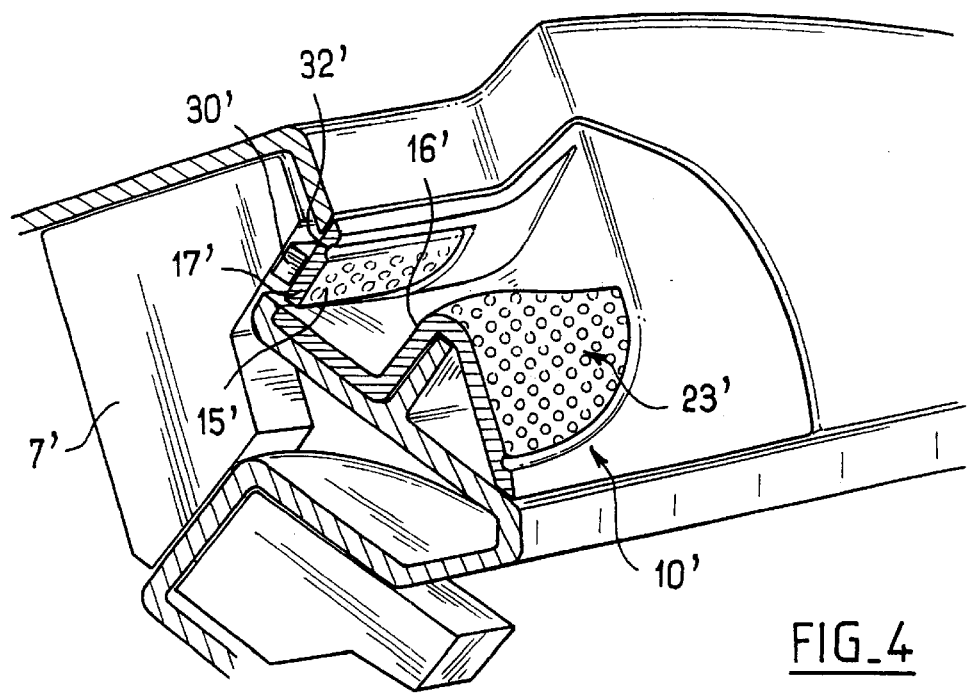
FIG_4
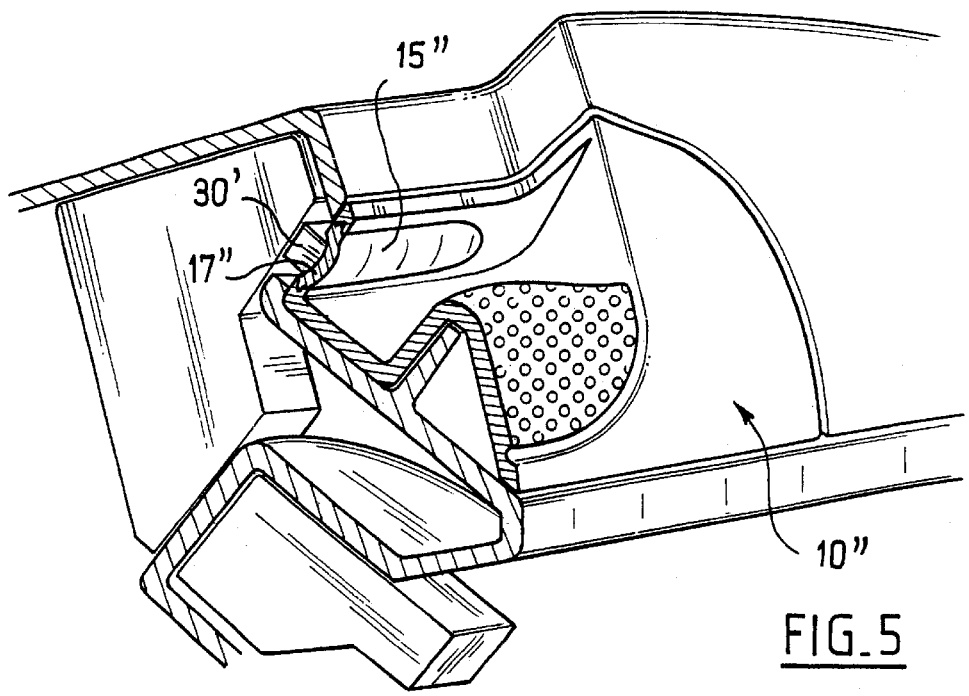
FIG_5

VEHICLE DOOR, IN PARTICULAR A TAILGATE

The present invention relates to vehicle doors in general, and more particularly but not exclusively to a motor vehicle tailgate.

A known tailgate has a lifting handle near the bottom of its outside face.

The handle is not used to close the tailgate, and in addition it often projects and is of unattractive appearance.

French patent application No. FR-A-2 744 754 discloses a handle device for a rear opening panel of a motor vehicle, the device including a hinged plate. When the panel is closed, the plate is in a retracted position and is therefore not accessible.

There exists a need to improve the ergonomics and the appearance of vehicle doors.

The invention provides a vehicle door, in particular a tailgate, the door comprising an outside face and an end face opposite from a region where it is hinged to the vehicle.

The door of the invention is characterized by the fact that it includes a handle integrated in the end face and an opening in the outside face of the door to give access to said handle when the door is closed.

In other words, in the invention, the integrated handle is always accessible, including when the door is closed, unlike above-cited French patent application No. FR-A-2 744 754.

By means of the invention, it is possible to make a door that does not have a projecting handle, thereby providing improved ergonomics.

In a particular embodiment, the handle has two bearing surfaces, one bearing surface serving to open the door, and the other being used to close it.

Thus, it is possible to use the handle to close the door, thus avoiding any need to bear directly against regions of the outside face of the door around the handle.

This is advantageous when the vehicle is dirty.

In a particular embodiment, the above-mentioned bearing surfaces are constituted by integrally-formed walls of plastics material fitted to a box structure of the door.

Preferably, at least one of said walls bears against a bearing surface of the box structure, thus enabling forces to be taken up.

In a particular embodiment, the bearing surfaces face each other.

Preferably, the handle has an outside wall integrated in the end face of the door, a grip zone in the center of said outside wall, and a setback for receiving the last phalanges (or fingertips) of the user's hand while opening or closing the door.

In a preferred embodiment, the door includes a lock having a control member, and the bearing surface that is used for opening is defined by a moving and/or deformable wall arranged to act on the control member of the lock while the user is exerting an upwardly-directed force on opening the door.

This embodiment makes it possible to integrate the lock in the door without any control member being visible on the outside face of the door, which gives an appearance that is particularly pleasing.

In addition, the opening control is situated very close to the lock, thus reducing the length of the rodding or cables used for actuating the lock, thereby improving tamperproofing.

The above-mentioned moving and/or deformable wall can be made in the form of a wall of rigid plastics material connected via a film hinge to the remainder of the handle or in the form of a flexible wall overmolded or fitted onto the remainder of the handle.

The surface of the handle against which the user bears can include, at least locally, a soft covering to improve user comfort.

Other characteristics and advantages of the present invention will appear on reading the following detailed description of non-limiting embodiments and on examining the accompanying drawings, in which:

FIG. 1 is a diagrammatic fragmentary perspective view of a motor vehicle tailgate of the invention;

FIG. 2 is a fragmentary section on a midplane of symmetry of the tailgate;

FIG. 3 shows the handle in isolation; and

FIGS. 4 and 5 show two variant embodiments.

FIG. 1 shows a motor vehicle tailgate 1 in the open position, the tailgate comprising an outside face 2, an inside face 3, and an end face 4.

The tailgate 1 comprises a box structure 12 supporting a window 5 and hinged to the motor vehicle in conventional manner via its end remote from its end face 4 (not shown in order to simplify the drawing).

In the embodiment described, the box structure 12 is made of reinforced plastics material.

On its inside face 3, the tailgate 1 has an opening 6 leading to a lock mechanism 7.

In the embodiment described, this lock mechanism 7 has a control button 30 enabling the tailgate 1 to be opened from its outside face 2.

In accordance with the invention, the tailgate 1 also has a handle 10 that can be seen in section in FIG. 2.

The outside face 2 of the tailgate 1 has an opening 14 giving access to the handle 10 when the tailgate 1 is closed.

The handle 10 has two bearing surfaces 15 and 16.

These bearing surfaces 15 and 16 correspond respectively to facing faces of the front and rear walls 17 and 18 of the handle 10.

The front and rear walls 17 and 18 are united by a web-forming wall 19 which bears against a bearing surface 11 of the box structure 12.

On their sides opposite from their facing sides, the front and rear walls 17 and 18 bear against walls 20 and 21 of the box structure 12.

The handle 10 is made as a single piece of plastics material and in addition to the front and rear walls 17 and 18 and the web-forming wall 19 as described above, it also has a substantially plane outside wall 22 which lies flush with the end face 4 of the tailgate 1, as can be seen in FIGS. 1 and 2.

The outside wall 22 surrounds a grip zone 23 that is ergonomically shaped.

The cavity defined by the front and rear walls 17 and 18 and by the web 19 constitutes a setback 24 inside the grip zone 23.

The grip zone 23 has a front wall 25 which is connected to the rear wall 18.

The handle 10 includes ribs 28 which are connected to the front wall 25 and which bear against the bearing surface 11 of the box structure 12.

These ribs 28 co-operate with the rear wall 18 to form a slot 29 in which a rib 21 of the box structure 12 is engaged.

The handle 10 is secured to the box structure 12 by any conventional fastening means, such as adhesive, snap-fastening, or screws, for example.

When the tailgate 1 is closed, the user seeking to raise it presses on the control button 30 while using the end phalanges to pull on the handle 10, the user's hand being engaged palm-up in the opening 14.

The end phalanges then come into contact with the bearing surface 15 constituted by the front wall 17.

To reclose the tailgate, the user inserts the end phalanges into the setback 24 so that they come into contact with the bearing surface 16.

At this moment, the initial phalanges of the user's hand can come to bear against the front wall 25 of the grip zone 23.

It will be observed that the handle 10 of the invention is of particularly pleasing appearance since it does not project.

In addition, it enables the tailgate 1 to be closed without any need to bear against its outside face 2.

FIG. 4 shows a variant embodiment.

In this variant, the lock 7 is replaced by a lock 7' that has no control button 30 that is accessible from the outside face of the tailgate, but instead it has an internal control member 30'.

The handle 10 in the preceding embodiment is replaced by a handle 10' which differs from the above-described handle 10 by the fact that the front wall 17 is replaced by a moving wall 17' that bears against the control member 30'.

The wall 17' in the embodiment of FIG. 4 is connected via a film hinge 32' to the remainder of the handle and it has an edge remote from said film hinge which is free so that by bearing against the moving portion 17' the user can actuate the control member 30'.

Beside the bearing surface 15, the moving wall 17' can present portions in relief for improving grip.

These portions in relief are advantageously implemented by means of a covering of soft material so as to increase comfort in use.

The front wall of the grip zone 23' of the handle 10' can also have such a covering.

In the handle 10" shown in FIG. 5, the above-mentioned moving wall 17' is replaced by a deformable wall 17" of elastomer which can be secured by any appropriate means to the remainder of the handle, for example it can be snap-fastened or overmolded.

This deformable wall defines a bearing surface 15".

Unlike the moving wall 17' in the embodiment of FIG. 4 which has a free edge, the deformable wall 17" in the embodiment of FIG. 5 is connected via its entire outline to the non-elastomer plastics material constituting the remainder of the handle, thus providing protection against ingress of water or moisture into the inside of the box structure.

In addition, using an elastomer to make the deformable wall 17" makes actuating the control member 30' relatively easy and agreeable for the user.

Naturally, it would not go beyond the ambit of the present invention to modify the shape of the handle or the way in which it is secured to the tailgate.

What is claimed is:

1. A vehicle door, the door comprising an outside face and an end face opposite from a region where it is hinged to the vehicle, wherein the door includes a handle integrated in the end face and an opening in the outside face of the door to give access to said handle when the door is closed.

2. The door according to claim 1, wherein the handle has two bearing surfaces, one bearing surface serving to open the door, and the other being used to close it.

3. The door according to claim 1, wherein said bearing surfaces are constituted by integrally-formed walls of plastics material fitted to a box structure of the door.

4. The door according to claim 1, wherein at least one of said walls bears against a bearing surface of the box structure.

5. The door according to claim 2, wherein said bearing surfaces face each other.

6. The door according to claim 1, wherein the handle has an outside wall integrated in the end face of the door, a grip zone in the center of said outside wall, and a setback for receiving the end phalanges of the user's hand while opening or closing the door.

7. The door according to claim 1, wherein the door includes a lock having a control member, and the handle presents a bearing surface that is used for opening and that is defined by a moving and/or deformable wall arranged to act on the control member of the lock while the user is exerting an upwardly-directed force on opening the door.

8. The door according to claim 1, wherein the fact that the moving and/or deformable wall is made in the form of a wall of rigid plastics material connected via a film hinge to the remainder of the handle.

9. A door according to claim 7, wherein the moving and/or deformable wall is made in the form of a flexible wall overmolded or fitted on the remainder of the handle.

10. The door according to claim 1, wherein the surface of the handle against which the user bears has a soft covering in order to increase user comfort.

11. The door according to claim 1, wherein the door is a tailgate.

\* \* \* \* \*